US012750752B2

(12) United States Patent
Chandrashekar et al.

(10) Patent No.: US 12,750,752 B2
(45) Date of Patent: Sep. 29, 2026

(54) CONDITIONAL FALLBACK CONFIGURATION FOR MCG-RLF

(71) Applicant: Nokia Technologies Oy, Espoo (FI)

(72) Inventors: Subramanya Chandrashekar, Bangalore (IN); Srinivasan Selvaganapathy, Bangalore (IN); Ahmad Awada, Munich (DE); Amaanat Ali, Espoo (FI); Tero Henttonen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 306 days.

(21) Appl. No.: 18/291,382

(22) PCT Filed: Jul. 19, 2022

(86) PCT No.: PCT/EP2022/070221

§ 371 (c)(1),
(2) Date: Jan. 23, 2024

(87) PCT Pub. No.: WO2023/006514

PCT Pub. Date: Feb. 2, 2023

(65) Prior Publication Data

US 2025/0106724 A1 Mar. 27, 2025

(30) Foreign Application Priority Data

Jul. 30, 2021 (IN) ............................. 202141034478

(51) Int. Cl.

*H04W 36/30* (2009.01)
*H04B 17/318* (2015.01)
*H04W 24/10* (2009.01)
*H04W 36/00* (2009.01)
*H04W 36/36* (2009.01)

(52) U.S. Cl.

CPC ........ *H04W 36/305* (2018.08); *H04B 17/328* (2023.05); *H04W 24/10* (2013.01); *H04W 36/00698* (2023.05); *H04W 36/037* (2023.05); *H04W 36/362* (2023.05)

(58) Field of Classification Search

None
See application file for complete search history.

(56) References Cited

U.S. PATENT DOCUMENTS

2015/0215965 A1* 7/2015 Yamada ................ H04W 76/27 370/329
2019/0356536 A1* 11/2019 Lee ..................... H04L 41/0816
2020/0260325 A1* 8/2020 Futaki ............... H04W 28/0967
2022/0007259 A1* 1/2022 Fujishiro ............... H04W 76/19
2022/0264680 A1* 8/2022 Kim ...................... H04W 76/15
2022/0338089 A1* 10/2022 Kim ...................... H04W 36/34
2022/0394583 A1* 12/2022 Deenoo ................. H04W 76/20

(Continued)

*Primary Examiner* — Benjamin Lamont
(74) *Attorney, Agent, or Firm* — Barta Jones, PLLC

(57) ABSTRACT

Improved techniques of handover involving dual connectivity configuration with CHO include configuring a UE with a conditional fallback configuration (CFC) linked to M-RLF event at the source MN. Specifically, the MN prepares a fallback configuration along with the CHO configuration for the UE. This fallback configuration is provided to the UE as a conditional configuration, but this is not linked to measurement-event but rather to a radio link failure event. The condition is linked to MCG-RLF along with additional measurement criteria.

14 Claims, 8 Drawing Sheets

(56) References Cited

U.S. PATENT DOCUMENTS

| | | | | |
|---|---|---|---|---|
| 2023/0023041 | A1* | 1/2023 | Yi | H04L 5/0048 |
| 2023/0217329 | A1* | 7/2023 | Wallentin | H04W 36/00837 370/331 |
| 2023/0292195 | A1* | 9/2023 | Bergqvist | H04W 36/0079 |

* cited by examiner

CONDITIONAL FALLBACK CONFIGURATION FOR MCG-RLF

RELATED APPLICATION

This application was originally filed as PCT Application No. PCT/EP2022/070221, filed on Jul. 19, 2022, which claims priority from IN application No. 202141034478, filed on Jul. 30, 2021, each of which is incorporated herein by reference in its entirety.

PRIORITY CLAIM

This application claims priority to Indian Provisional Patent Application No. 202141034478, filed on Jul. 30, 2021, entitled "CONDITIONAL FALLBACK CONFIGURATION FOR MCG-RLF", the entirety of which is hereby incorporated by reference.

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the $3^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's LTE upgrade path for mobile networks. In LTE, base stations or access points (APs), which are referred to as enhanced Node AP (eNBs), provide wireless access within a coverage area or cell. In LTE, mobile devices, or mobile stations are referred to as user equipment (UE). LTE has included a number of improvements or developments.

A global bandwidth shortage facing wireless carriers has motivated the consideration of the underutilized millimeter wave (mmWave) frequency spectrum for future broadband cellular communication networks, for example. mmWave (or extremely high frequency) may, for example, include the frequency range between 30 and 300 gigahertz (GHz). Radio waves in this band may, for example, have wavelengths from ten to one millimeters, giving it the name millimeter band or millimeter wave. The amount of wireless data will likely significantly increase in the coming years. Various techniques have been used in attempt to address this challenge including obtaining more spectrum, having smaller cell sizes, and using improved technologies enabling more bits/s/Hz. One element that may be used to obtain more spectrum is to move to higher frequencies, e.g., above 6 GHz. For fifth generation wireless systems (5G), an access architecture for deployment of cellular radio equipment employing mmWave radio spectrum has been proposed. Other example spectrums may also be used, such as cmWave radio spectrum (e.g., 3-30 GHz).

SUMMARY

According to an example implementation, a method includes transmitting, by a user equipment in a network, measurement data to a master network node serving the user equipment, the measurement data representing a measurement report. The method further includes receiving, from the master network node, radio resource control reconfiguration data representing a radio resource control reconfiguration, the radio resource control reconfiguration including a conditional fallback configuration linked to a master cell group radio link failure event with the master network node.

According to an example implementation, an apparatus includes at least one processor and at least one memory including computer program code, the at least one memory and the computer program code configured to, with the at least one processor, cause the apparatus at least to transmit, by a user equipment in a network, measurement data to a master network node serving the user equipment, the measurement data representing a measurement report. The at least one memory and the computer program code are further configured to, with the at least one processor, cause the apparatus at least to receive, from the master network node, radio resource control reconfiguration data representing a radio resource control reconfiguration, the radio resource control reconfiguration including a conditional fallback configuration linked to a master cell group radio link failure event with the master network node.

According to an example implementation, an apparatus includes means for transmitting, by a user equipment in a network, measurement data to a master network node serving the user equipment, the measurement data representing a measurement report. The apparatus also includes means for receiving, from the master network node, radio resource control reconfiguration data representing a radio resource control reconfiguration, the radio resource control reconfiguration including a conditional fallback configuration linked to a master cell group radio link failure event with the master network node.

According to an example implementation, a computer program product includes a computer-readable storage medium and storing executable code that, when executed by at least one data processing apparatus, is configured to cause the at least one data processing apparatus to transmit, by a user equipment in a network, measurement data to a master network node serving the user equipment, the measurement data representing a measurement report. The executable code, when executed by at least one data processing apparatus, is also configured to cause the at least one data processing apparatus to receive, from the master network node, radio resource control reconfiguration data representing a radio resource control reconfiguration, the radio resource control reconfiguration including a conditional fallback configuration linked to a master cell group radio link failure event with the master network node.

According to an example implementation, a method includes receiving, by a master network node from a user equipment in a network, measurement data representing a measurement report. The method further includes transmitting, by the master network node to the user equipment, radio resource control reconfiguration data representing a radio resource control reconfiguration, the radio resource control reconfiguration including a conditional fallback configuration linked to a master cell group radio link failure event at the master network node.

According to an example implementation, an apparatus includes at least one processor and at least one memory including computer program code, the at least one memory and the computer program code configured to, with the at least one processor, cause the apparatus at least to receive, by a master network node from a user equipment in a network, measurement data representing a measurement report. The at least one memory and the computer program code are further configured to transmit, by the master network node to the user equipment, radio resource control reconfiguration data representing a radio resource control reconfiguration, the radio resource control reconfiguration including a conditional fallback configuration linked to a master cell group radio link failure event at the master network node.

According to an example implementation, an apparatus includes means for receiving, by a master network node from a user equipment in a network, measurement data representing a measurement report; and means for transmitting, by the master network node to the user equipment, radio resource control reconfiguration data representing a radio resource control reconfiguration, the radio resource control reconfiguration including a conditional fallback configuration linked to a master cell group radio link failure event at the master network node.

According to an example implementation, a computer program product includes a computer-readable storage medium and storing executable code that, when executed by at least one data processing apparatus, is configured to cause the at least one data processing apparatus to receive, by a master network node from a user equipment in a network, measurement data representing a measurement report. The executable code, when executed by at least one data processing apparatus, is also configured to cause the at least one data processing apparatus to transmit, by the master network node to the user equipment, radio resource control reconfiguration data representing a radio resource control reconfiguration, the radio resource control reconfiguration including a conditional fallback configuration linked to a master cell group radio link failure event at the master network node.

According to an example implementation, a method includes receiving, by a secondary network node from a master network node in a network, conditional fallback configuration data representing a conditional fallback configuration for a user equipment served by the master network node, the conditional fallback configuration linked to a master cell group radio link failure event at the master network node. The method further includes transmitting, by the secondary network node to the master network node, conditional handover data representing a conditional handover configuration from the master cell group to a secondary cell group, the master network node being configured to send, to a user equipment served by the master network node, radio resource control reconfiguration data representing a radio resource control reconfiguration, the radio resource control reconfiguration including the conditional fallback configuration.

According to an example implementation, an apparatus includes at least one processor and at least one memory including computer program code, the at least one memory and the computer program code configured to, with the at least one processor, cause the apparatus at least to receive, by a secondary network node from a master network node in a network, conditional fallback configuration data representing a conditional fallback configuration for a user equipment served by the master network node, the conditional fallback configuration linked to a master cell group radio link failure event at the master network node. The at least one memory and the computer program code are further configured to transmit, by the secondary network node to the master network node, conditional handover data representing a conditional handover configuration from the master cell group to a secondary cell group, the master network node being configured to send, to a user equipment served by the master network node, radio resource control reconfiguration data representing a radio resource control reconfiguration, the radio resource control reconfiguration including the conditional fallback configuration.

According to an example implementation, an apparatus includes means for receiving, by a secondary network node from a master network node in a network, conditional fallback configuration data representing a conditional fallback configuration for a user equipment served by the master network node, the conditional fallback configuration linked to a master cell group radio link failure event at the master network node; and means for transmitting, by the secondary network node to the master network node, conditional handover data representing a conditional handover configuration from the master cell group to a secondary cell group, the master network node being configured to send, to a user equipment served by the master network node, radio resource control reconfiguration data representing a radio resource control reconfiguration, the radio resource control reconfiguration including the conditional fallback configuration.

According to an example implementation, a computer program product includes a computer-readable storage medium and storing executable code that, when executed by at least one data processing apparatus, is configured to cause the at least one data processing apparatus to receive, by a secondary network node from a master network node in a network, conditional fallback configuration data representing a conditional fallback configuration for a user equipment served by the master network node, the conditional fallback configuration linked to a master cell group radio link failure event at the master network node. The executable code, when executed by at least one data processing apparatus, is also configured to cause the at least one data processing apparatus to transmit, by the secondary network node to the master network node, conditional handover data representing a conditional handover configuration from the master cell group to a secondary cell group, the master network node being configured to send, to a user equipment served by the master network node, radio resource control reconfiguration data representing a radio resource control reconfiguration, the radio resource control reconfiguration including the conditional fallback configuration.

The details of one or more examples of implementations are set forth in the accompanying drawings and the description below. Other features will be apparent from the description and drawings, and from the claims.

DETAILED DESCRIPTION

Figure 1:
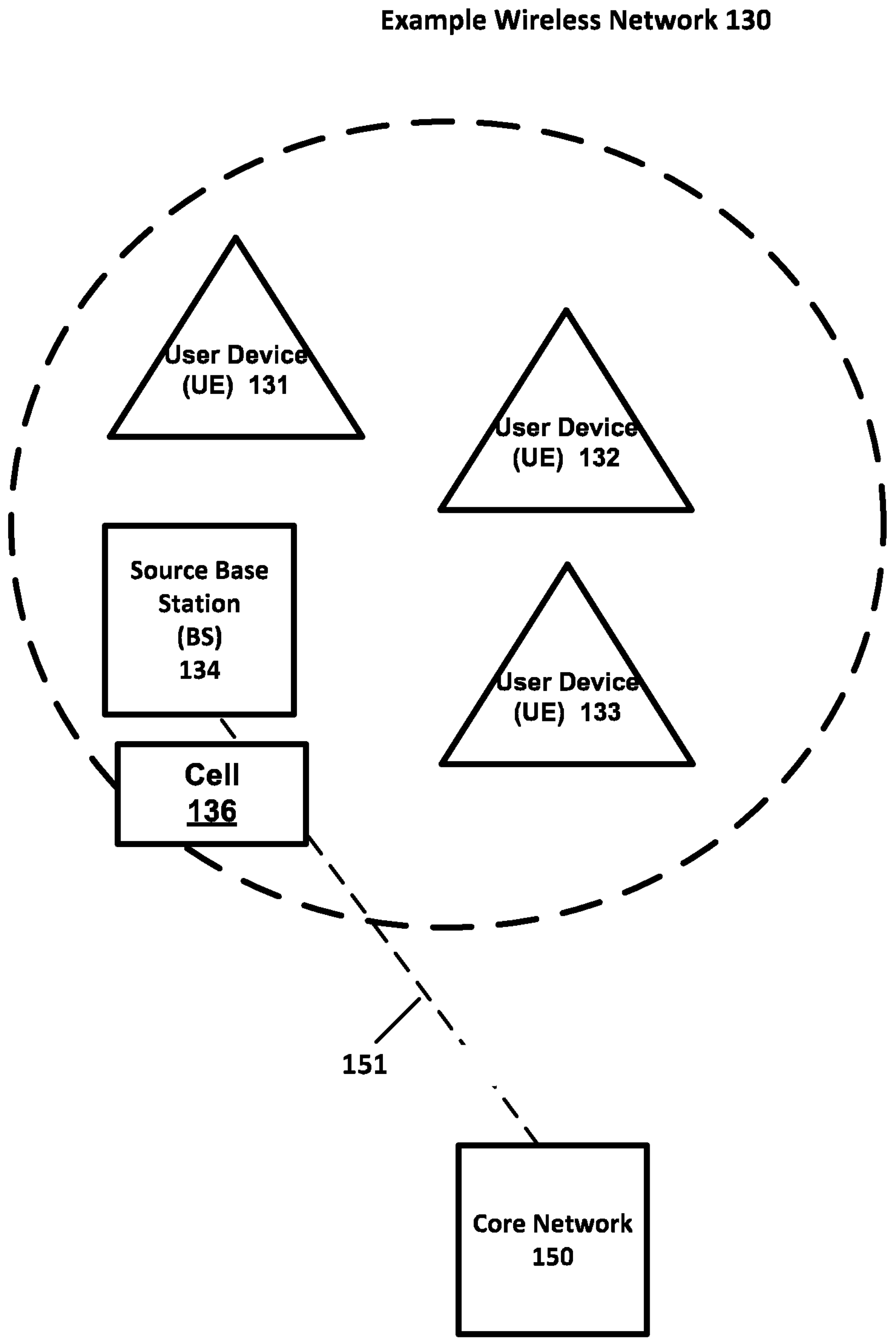
FIG. 1 is a block diagram of a digital communications network according to an example implementation.

FIG. 1 is a block diagram of a digital communications system such as a wireless network 130 according to an example implementation. In the wireless network 130 of FIG. 1, user devices 131, 132, and 133, which may also be referred to as mobile stations (MSs) or user equipment (UEs), may be connected (and in communication) with a base station (BS) 134, which may also be referred to as an access point (AP), an enhanced Node B (eNB), a gNB (which may be a 5G base station) or a network node. At least part of the functionalities of an access point (AP), base station (BS) or (e)Node B (eNB) also may be carried out by any node, server or host which may be operably coupled to a transceiver, such as a remote radio head. BS (or AP) 134 provides wireless coverage within a cell 136, including the user devices 131, 132 and 133. Although only three user devices are shown as being connected or attached to BS 134, any number of user devices may be provided. BS 134 is also connected to a core network 150 via an interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a/centralized unit (CU) and/or a distributed unit (DU) in the case of a split BS or split gNB), or other network node.

According to an illustrative example, a BS node (e.g., BS, eNB, gNB, CU/DU, . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, . . . ) or BS may provide one or more wireless communication services for one or more UEs or user devices, e.g., to allow the UEs to have wireless access to a network, via the RAN node. Each RAN node or BS may perform or provide wireless communication services, e.g., such as allowing UEs or user devices to establish a wireless connection to the RAN node, and sending data to and/or receiving data from one or more of the UEs. For example, after establishing a connection to a UE, a RAN node or network node (e.g., BS, eNB, gNB, CU/DU, . . . ) may forward data to the UE that is received from a network or the core network, and/or forward data received from the UE to the network or core network. RAN nodes or network nodes (e.g., BS, eNB, gNB, CU/DU, . . . ) may perform a wide variety of other wireless functions or services, e.g., such as broadcasting control information (e.g., such as system information or on-demand system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

In addition, the techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC). Many of these new 5G (NR)—related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of 10-5 and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to a eMBB UE (or an eMBB application running on a UE).

The various example implementations may be applied to a wide variety of wireless technologies, wireless networks, such as LTE, LTE-A, 5G (New Radio, or NR), cmWave, and/or mmWave band networks, or any other wireless network or use case. LTE, 5G, cmWave and mmWave band networks are provided only as illustrative examples, and the various example implementations may be applied to any wireless technology/wireless network. The various example implementations may also be applied to a variety of different applications, services or use cases, such as, for example, ultra-reliability low latency communications (URLLC), Internet of Things (IoT), time-sensitive communications (TSC), enhanced mobile broadband (eMBB), massive machine type communications (MMTC), vehicle-to-vehicle (V2V), vehicle-to-device, etc. Each of these use cases, or types of UEs, may have its own set of requirements.

According to an example embodiment, a random access channel (RACH) procedure or random access procedure may be performed by a UE or user device for a variety of reasons (or triggers). For example, a UE may use a random access procedure to establish a connection with a network node (e.g., BS, AP, eNB, gNB). Random access procedures may have the possibility of failure, e.g., due to collisions or other reasons. A random access procedure may be contention based (a contention based random access (CBRA) procedure) or contention free (a contention free random access (CFRA) procedure). In addition, there are two types of random access procedures, namely a 4 step random access procedure, and a 2-step random access procedure.

Figure 2:
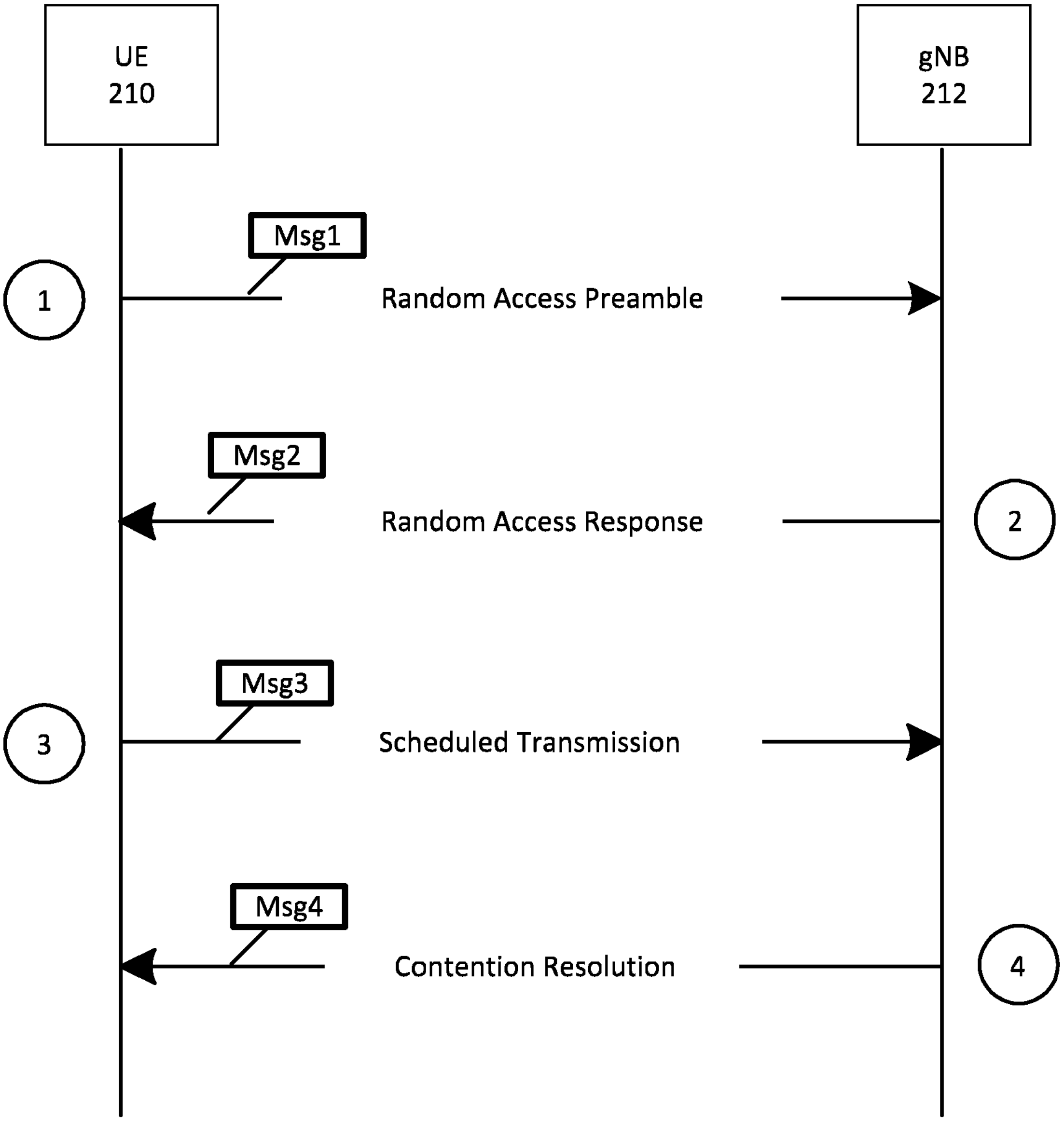
FIG. 2 is a diagram illustrating a 4-step contention based random access (CBRA) procedure.

FIG. 2 is a diagram illustrating a 4-step contention based random access (CBRA) procedure between a UE 210 and a gNB 212. In a 4-step CBRA procedure, the UE 210 starts the random access procedure at step 1 by sending a random access preamble (message 1 or Msg1) to the gNB 212. There may be different groups of RACH preambles defined, depending on the size of the first scheduled uplink transmission from the UE 210 and on the UE's channel conditions. The UE 210 may obtain information on how to access the network from system information block 1 (SIB1), which are part of the system information (SI) that is transmitted (e.g., broadcasted or signalled) by the gNB 212. The RACH preamble may be designed for relatively low complexity and high robustness (and thus, enhanced likelihood of reception by the gNB 212) despite a lack of accurate timing control. If the gNB 212 receives the random access preamble successfully, the gNB 212 responds at step 2 with a Random Access Response (RAR or message 2 or Msg2). The RAR may include a random access preamble identifier (RAPID) that identifies the received RACH preamble, an uplink timing advance (TA) for the UE 210 (e.g., calculated by the gNB 212 based on the received RACH preamble from the UE 210), a temporary identity, e.g., such as a cell radio network temporary identifier (C-RNTI), assigned to the UE 210, and an uplink (UL) grant indicating physical uplink shared channel (PUSCH) resources to be used for UE 210's subsequent transmission. At step 3, upon receiving the RAR, the UE 210 is able to send a scheduled transmission to the gNB 212 (message 3 or Msg3) via the scheduled PUSCH resources indicated in the UL grant of the RAR. At step 4, if the gNB 212 receives the scheduled transmission via PUSCH, the gNB 212 sends a contention resolution message (message 4 or Msg4) to indicate whether the scheduled transmission by the UE 210 was successful and to ensure that the UE 210 does not incorrectly use another UE's identity.

A 2-step random access (e.g., CBRA) procedure was introduced to reduce the number of round-trip transmissions between the UE and the gNB (and thus reduce the amount of latency) until the RACH procedure is successful, namely from 2 round-trip transmissions to 1 round trip transmission. The 2-step random access procedure reduces the number of round-trip transmissions by combining both message 1 and message 3 (Msg1 and Msg3) of the 4-step random access procedure into a new message called message A or MsgA, and by further combining both message 2 and message 4 (Msg2 and Msg4) of the 4-step random access procedure into a new message called message B or MsgB. Due to its property of minimizing RACH channel occupancy until successful RACH access, 2-step RACH procedure has been considered for unlicensed access, since this procedure may reduce the amount of Listen Before Talk (LBT) attempts, and thereby increase the probability of successfully completing the RACH procedure. However, there may be a higher likelihood of failure for a 2-step random access procedure as compared to a 4-step random access procedure.

In addition to 2-step and 4-step contention based random access (CBRA) procedures, 2-step and 4-step contention free random access (CFRA) procedures may also be supported. For example, for the 4-step CFRA procedure, the gNB may first provide the UE with a random access preamble assignment for Msg1 transmission. For the 2-step CFRA procedure, the gNB may provide the UE with both a random access preamble assignment and PUSCH assignment (UL grant that identifies PUSCH resources for UE uplink transmission) for MsgA transmission.

In dual-connectivity (or more generally referred to as multi-connectivity), a UE (or user device) may be connected to multiple base stations or network nodes simultaneously, where the network nodes may be of the same or different radio access technologies (RATs). Thus, for multi-connectivity, each of the network nodes may be an eNB, gNB, or other network node. For example, one of the network nodes may be referred to as a master node (MN) or master network node (e.g., master gNB (MgNB) or master eNB (MeNB)), while another network node may be referred to as a secondary node (SN) or a secondary network node (e.g., a secondary gNB (SgNB) or secondary eNB (SeNB)), e.g, with respect to the classical BS architecture. For dual or multi-connectivity, the UE may, for example, establish a first connection to a MN, and then establish a second connection to a SN. For each of the network nodes (MN or SN) that the UE is connected to, the UE may be able to communicate and/or receive data via multiple (a plurality of) cells, e.g., using carrier aggregation (CA). The cells of the MN may be referred to as a master cell group (MCG), while the cells of a SN may be referred to as a secondary cell group (SCG).

In the case of dual or multi-connectivity, the first cell within the MN to which the UE connects is typically known as the Primary Cell (PCell), while the first cell within the SN to which the UE connects is typically known as the Primary Secondary Cell (PScell), which serves as a primary cell as far as the UE's connectivity to the SN is concerned. The PCell and the PSCell are each allocated physical uplink control channel (PUCCH) resources to allow the UE to send HARQ ACK/NAK (acknowledgement/negative acknowledgement) feedback, and other control information, to the MCG (or MN) and SCG (or SN), respectively.

Figure 3:
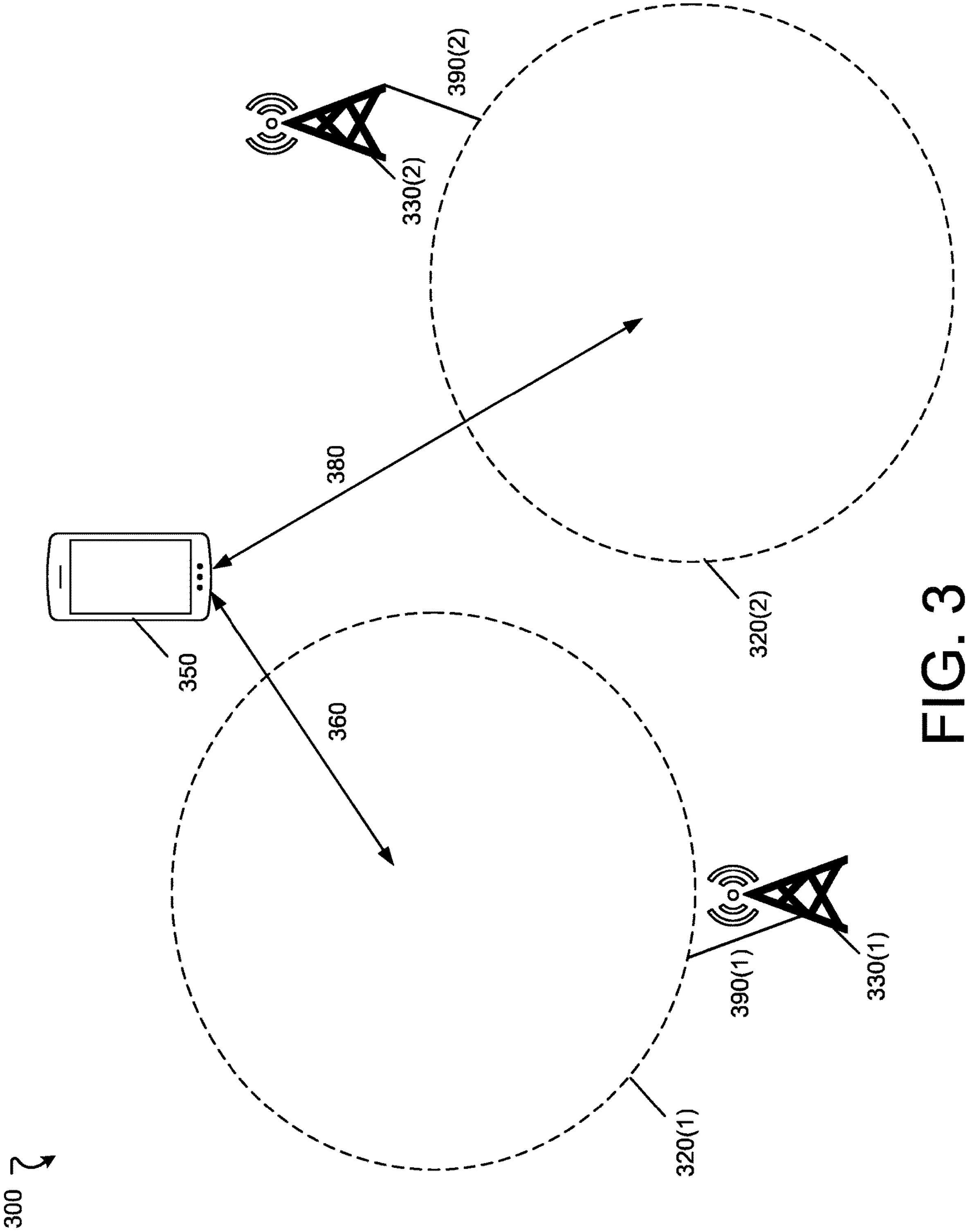
FIG. 3 is a diagram illustrating a dual connectivity scenario, according to an example implementation.

FIG. 3 is a diagram illustrating a network 300 in which dual connectivity is established. Within the network 300, a UE 350 is served by a PCell 320(1) associated with a MN 330(1). The UE 350 has an RRC connection 360 with the PCell 320(1). The UE 250 is also served by a PSCell 320(2) associated with a SN 330(2). The UE 350, in some implementations, has a NR-DC connection 380 with the PSCell 320(2). Each of the MN 330(1) and SN 330(2) communicate with PCell 320(1) and PSCell 320(2), respectively, over respective data radio bearers (DRBs) 390(1) and 390(2).

To establish the dual connectivity within the network 300, the UE 350 establishes the RRC connection 360 with the network 300 at the PCell 320(1). If the UE 350 is eligible (i.e., configured) for dual connectivity, the network 300 can assign the PSCell 320(2) to the UE 350 based on measurements (e.g., reference signal received power (RSRP)) made by the UE 350.

Handover (HO) (or cell change) procedures may be used in 5G NR to allow a change or handover of the UE from a source network node to a target network node, e.g., to maintain robustness of connection between a user equipment (UE) and a wireless network over different cells. A UE handover (HO) may be performed for a UE for both MN and SN, e.g., based on measurement reports and/or a HO trigger condition being satisfied.

For example, with respect to a UE connected to only one network node (single connectivity, or with respect to a MN HO for dual connectivity for the UE), to effect a HO, a UE sends measurement reports to a source network node indicating measurement values for serving and neighboring cells such as reference signal received power (RSRP). The measurement report is typically sent in an event-triggered manner when the measurement values meet certain criteria (e.g., the RSRP of neighboring cell becomes better than the measurement of the serving cell by some offset for some Time-to-Trigger (TTT). Upon receiving the measurement report, the source network node (e.g., source gNB) identifies a target network node (a target gNB) to which the source gNB sends a HO request. The target gNB may acknowledge the HO request by sending an acknowledgement message to the source gNB. In response, the source gNB then sends a radio resource control (RRC) reconfiguration message to the UE, indicating a HO to the target gNB; at this point, data exchange between the UE and the source gNB terminates and the source gNB forwards data intended for the UE to the target gNB. The UE then initiates communication with the target gNB. For example, the UE sends a physical random access channel (PRACH) preamble to the target gNB. In response, the target gNB sends the UE a random access response (RAR), and the UE sends to the target gNB a message indicating that the RRC reconfiguration is complete. The target gNB sends the forwarded data to the UE and the connection between the UE and target gNB is established.

Alternatively, conditional HO (CHO) has been introduced to reduce radio link and HO failures. In CHO, a configured event triggers the UE to send a measurement report. Based on this report, the source gNB can prepare one or more target cells for the handover (CHO Request+CHO Request Acknowledge) and then sends an RRC Reconfiguration (including handover command) to the UE. In the baseline HO described above, the UE will immediately access the target cell to complete the handover. In contrast, for CHO, the UE will only access the target cell once an additional CHO execution condition is met (the handover preparation and execution phases are decoupled). The CHO execution condition may be configured, e.g., by the source network node in RRC Reconfiguration.

For a UE configured for dual connectivity (where the UE is connected to both a master node (MN) and a secondary node (SN)), with respect to the MN, a conditional handover may be prepared for the MN to allow the UE to perform a conditional handover from a source MN to a target MN when the CHO execution condition is met. Likewise, with respect to the SN, a Conditional PSCell Change (CPC) may be configured to allow the UE to perform a conditional handover or conditional PSCell change from a source SN to a target SN when the CHO/CPC execution condition is met for the target SN.

A UE may perform a handover to one or both of a target SN and/or target MN. However, currently, a UE is required to first have a connection established with a target MN before the handover or RACH procedure can be performed to a target SN. Thus, currently, if a connection (RACH success) to a target MN (e.g., PCell of MCG) has not been performed, UE attempts at RACH (random access procedure) access to a target SN/target SCG (PSCell) is not permitted because PCell RACH success is currently a prerequisite for performing a random access procedure with a SN/SCG. Even if the UE implementation performs such an attempt, currently, the target SN will not respond to RACH access for at least for the uplink packet unless the target SN receives a confirmation from the MN/MCG that a connection has been established between the UE and the MN/MCG (e.g., such as, for example, via receipt of a SGNB-Reconfiguration-complete or S-Node Reconfiguration-complete message from the target MN which is meant to activate the target SCG configuration for the UE at the target SCG/target SN). Currently, no resources (such as time-frequency resources and/or signaling radio bearer) are even allocated at target SN to allow UE transmission of a RACH Msg1 or Msg3 (for example) to the target SN until the target SN receives such a confirmation from the target MN/MCG that a connection has been established (e.g., successful RACH) by the UE with the MN/MCG. If the target MCG PCell access fails for the UE (e.g., radio link failure, RACH failure, HO failure for UE with respect to the target MN/MCG) (e.g., such as from a T304 timer Expiry, or other cause), there is no way for the UE to communicate with the network at that point, since the UE is also unable to communicate with the target SN (RACH messages from UE will be rejected by target SN because no confirmation of a successful UE-target MN connection has been received by target SN). Therefore, currently, in case of a MN radio link failure for a UE (e.g., radio link failure, RACH failure, HO failure), the only solution or response is for a RRC Re-establishment (re-establishing of the connection with a MN via new RACH procedure with a same or different MN), and no communication is permitted to the target SN, and which is expensive considering the re-establishment of bearers that will be required and the delay or service interruption time that will typically be experienced by the UE.

The handover (HO) procedure for a user equipment (UE) in dual connectivity (multi-radio dual connectivity (MR-DC) or new radio dual connectivity (NR-DC)) is similar to single connectivity, with minor additions, for example:

- A UE may be configured to perform HO on primary cell (PCell), and optionally also configured for CPC (conditional cell change) on primary secondary cell (PSCell).
- A UE may be configured only with conditional handover (CHO) on PCell.

There are two options possible with CPC for PSCell. CPC for the source PSCell or CHO command (for target PCell) containing CPC command for target PSCell. The latter is not yet supported by 3GPP.

In this document, there is a use case in which the UE is configured with dual connectivity and CHO is configured for PCell. The use case assumes that the secondary node (SN) remains the same with inter-master node (MN) CHO being configured to the UE.

If the UE experiences a master cell group radio link failure (MCG-RLF) while the CHO executions are pending, the existing Rel-16 3GPP procedure may trigger CHO recovery if the selected target cell as part of cell selection is a prepared CHO candidate. Otherwise the UE will trigger a radio resource control (RRC) connection re-establishment.

In conventional approaches to handover involving dual connectivity configuration with CHO with or without CPC enabled, UE tries for PCell access first. UE will perform the HO first and subsequently start the PSCell change if PCell HO succeeds.

In the conventional approaches, if a master node RLF (M-RLF) happens before CHO execution, CHO recovery is an optional feature and only possible if the selected PCell is a prepared target cell with CHO configuration (CHO execution will be performed on the selected PCell). Otherwise, RRC re-establishment is performed which will release CHO configurations.

- RRC re-establishment leads to SRB/DRB re-establishment and causes high latency and user service disruption.
- No solutions are yet available to handle the above situation without leading to RRC re-establishment, if there is no prepared target cell.

Even if the UE's current PSCell (SCG) configured as a PCell as part of CHO configuration:

- There is no guarantee that the UE selects PSCell as target PCell in case of CHO recovery as the following may impede this process (i.e., network has no way to control the selection towards the current PSCell.
  - The UE may have multiple intra-frequency CHO configurations to choose from and it continues evaluating those targets.
  - The UE may end up preferring an intra-frequency PCell instead of an inter-frequency PCell from the SCG.
- A CHO configuration execution cannot be linked to a M-RLF event (no CHO execution condition for configured cell) since they may only be linked to a measurement criterion.

Accordingly, if M-RLF occurs, it is unlikely for the UE or network to prevent RRC re-establishment when the selected cell is not a CHO prepared cell. RRC re-establishment leads to re-establishment of bearers and service disruption.

In Rel-16 MCG-Failure recovery via SCG (SRB3) or split bearer is possible with use of fast MCG recovery procedure. But this procedure is not enabled when the CHO command is pending at UE. Enabling this feature when CHO is pending may have impact on the pending CHO evaluations.

- As per this procedure UE reports the M-RLF via SCG as RRC message to MN.
- MN receives the MCG Failure Indication message and may take any of the following actions:
  - Based on a measurement report, MN may trigger handover to best target MCG and send it as network response to the failure indication.
  - If no suitable target cell is found and if MN intends to map MCG bearer to SCG RDBs it can send reconfiguration for bearer mapping in response to this message.
  - MN may completely move the whole RRC-Connection to SN by triggering handover to MN. This is sent as a handover reconfiguration message in response to M_RLF indication.
  - MN does not take any action. Timer T314 expires at UE and UE trigger RRC-Reestablishment.

The above options for HO procedure for a UE in DC mode with MCG-RLF have disadvantages as follows:

- The above options introduce additional signaling and also interruptions for case if the fallback to SCG (handover from MN to SN) is the preferred case for this scenario.
- Configuring the handover to SN as CHO recovery configuration may not guarantee UE choosing this configuration as current CHO recovery procedure is applicable only if the cell selection procedure selects SCG as best cell. This may not be possible always and it will require changes to UE cell selection priority which will also impact the idle mode behaviour.
- Use of fast MCG recovery via SCG is not supported during CHO in Rel-16. Even if it is enabled, the UE needs to wait for the network command to receive a new configuration. Until UE receives new configuration from network, there could be interruptions for the DRBs mapped to MCG.

In contrast to the above-described conventional approaches to handover involving dual connectivity configuration with CHO, improved techniques include configuring a UE with a conditional fallback configuration (CFC) linked to M-RLF event at the source MN. Specifically, the MN prepares a fallback configuration along with the CHO configuration for the UE. This fallback configuration is provided to the UE as a conditional configuration, but this is not linked to measurement-event but rather to a radio link failure event. The condition is linked to MCG-RLF along with additional measurement criteria.

Advantageously, the above-described improved technique of recovering from a MCG-RLF does not require a RRC reconnection and avoids the latency and service disruptions such a reconnection causes.

A crux of the above-described improved technique is to configure the UE with a CFC linked to a M-RLF event at the source MN.

- The MN prepares a fallback configuration along with the CHO configuration for the UE.
- The fallback configuration is provided to the UE as a conditional configuration, but this is linked to a failure event rather than a measurement-event.
- In some implementations, the condition includes a linkage to a MCG-RLF event at the MN along with additional measurement criteria.

There are some fallback configuration options upon a RLF:

- Alternative 1:
  - This fallback configuration maps to immediate handover from MN to SN. i.e re-configuring the current PSCell as PCell. This configuration is equivalent to a MN-SN handover configuration.
  - Example aspects of this option include the following:
    - An inclusion of a new conditional reconfiguration which is mapped to a MCG-RLF event and includes serving SCG measurements.
    - The UE activating the conditional configuration received in response to detecting a MCG-RLF after checking the additional SCG measurement and stopping evaluation of all pending CHO configurations.

An inclusion of a dedicated scheduling request resource to enable faster switching to fallback configuration via the active SCG with the SN differentiating the UE configuration based on a used uplink resource (e.g., PUSCH).

Alternative 2:

Alternative 2a:

This fallback configuration temporarily anchors the MCG DRBs as SCG DRBs, i.e., routing the MCG bearer data via the SN, until a better PCell is found and UE reconfigured. The SCG DRBs are re-routed back through the MN once the PCell access is successful. This is equivalent to remapping MCG DRBs as MCG-split bearers with no data sent in a MCG leg.

Alternative 2b:

In this case, the fallback configuration is a bearer remapping configuration from MCG to SCG. In this case, the MCG DRBs are temporarily reconfigured as SCG DRBs (load permitting).

Example aspects of this option include the following:

An inclusion of a new conditional reconfiguration temporarily anchoring the MCG DRBs as SCG DRBs until a better PCell is found.

An inclusion of a new conditional reconfiguration initiating a DRBs remapping from the MCG to the SCG.

A further optimization would allow prevention of a RACH attempt as follows. If a Timing Advance (TA) timer is running at the SCG when the required condition for fallback configuration is met, the UE may send the Scheduling Request (SR) using a dedicated resource which is mapped to the fallback configuration. An uplink grant in response to SR also indicates that it is configured for transmission of handover complete for fallback configuration. In this way the recovery can be faster without a reconfiguration with sync (i.e., RACH access).

Figure 4:
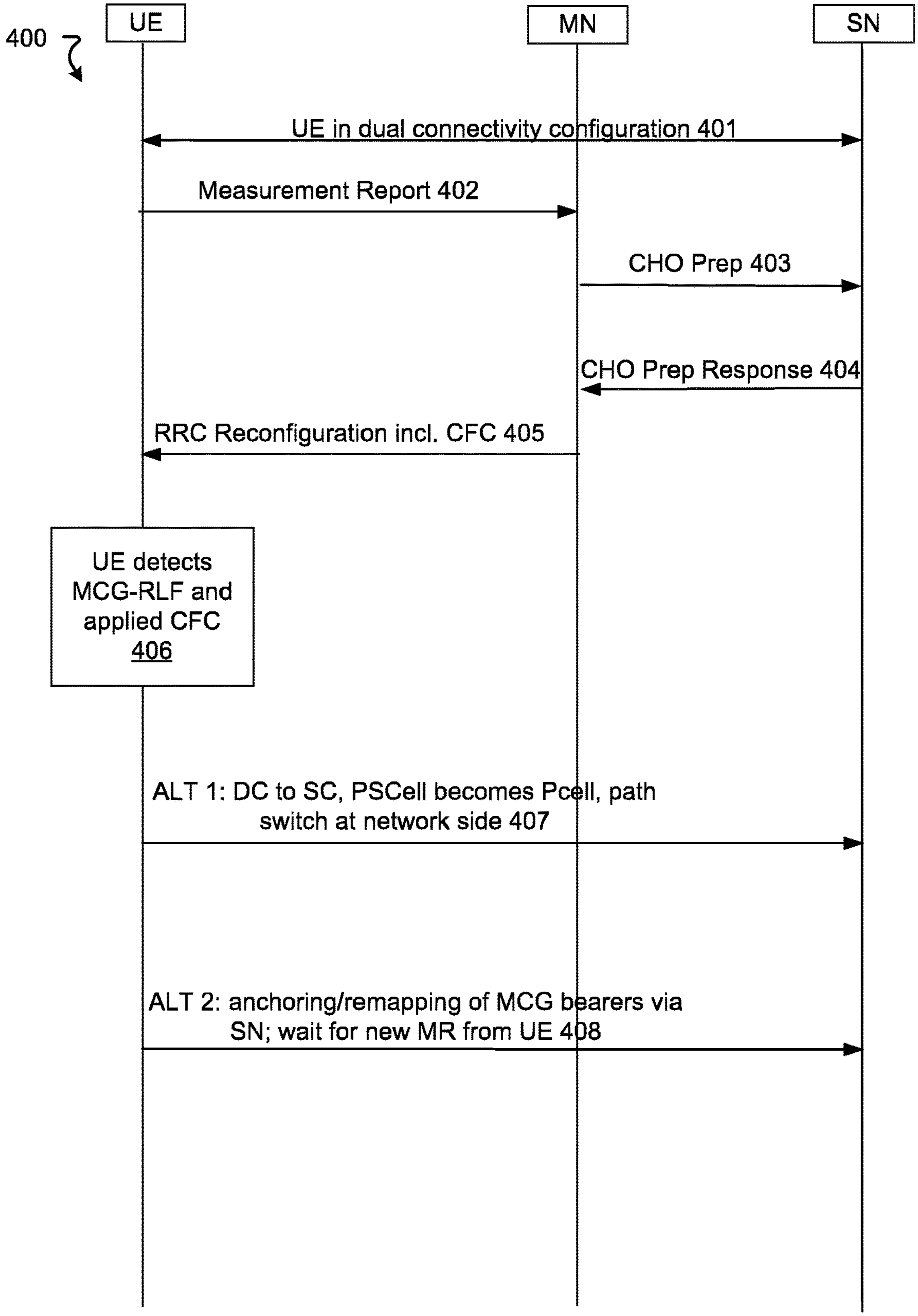
FIG. 4 is a sequence diagram illustrating a process of generating and applying a conditional fallback configuration (CFC) for a master cell group radio link failure (MCG-RLF) according to an example implementation.

FIG. 4 is a sequence diagram illustrating a process 400 of generating and applying a conditional fallback configuration (CFC) for a master cell group radio link failure (MCG-RLF).

At 401, the UE is in a dual connectivity configuration. In some implementations, the UE is in a multi-radio dual connectivity (MR-DC) configuration. In some implementations, the UE is in a new radio dual connectivity (NR-DC) configuration.

At 402, the UE sends a measurement report to the MN. In some implementations, the measurement report includes measurements of reference signal received power (RSRP) over cells other than the PCell within the network. The MN prepares a CPC configuration with another target node based on measurements in the measurement report.

At 403, the MN prepares, as part of a Xn procedure, a CHO with the current SN serving the UE for a MN-SN handover. In some implementations, there is a change in the Uu (i.e., air/RRC interface) used to link a fallback configuration against a M-RLF event, according to either the Alternative 1 or Alternative 2 described above. The MN also sends a CPC preparation request to the SN. In some implementations, the preparation request is sent to the SN via a Xn interface. In some implementations, the preparation request indicates details to perform a path switch if the fallback configuration is executed at the UE.

At 404, the MN receives a CPC preparation response from the SN via the Xn interface. In some implementations, as part of the RAN3 change, the response includes a conditional fallback SCG CHO configuration of the UE for a M-RLF event. In some implementations, the SN allocates potential resources for MCG DRBs.

At 405, the MN sends to the UE a RRC reconfiguration including a CHO configuration for target cells and a fallback configuration. In some implementations, as part of the RAN3 change, in response to the UE executing the fallback configuration and sending a RRC reconfiguration complete, the SN executes the path switch and assumes the role of the MN. The fallback configuration is mapped to one or both of a MCG-RLF event and a RSRP measurement of the target MCG being greater than a threshold.

At 406, the UE detects a MCG-RLF event. The UE checks that the strength (quality) of the radio link of the target MCG is greater than the threshold and/or meets specified radio-related criteria for the fallback configuration. The UE also applies the fallback configuration and, in some implementations, sends a handover complete indication to the current SCG without RACH access, i.e., the SN remains the same. Note that the UE does not perform RRC reestablishment.

At 407, under Alternative 1, the network transitions from dual connectivity to single connectivity, the PSCell becomes the PCell, and there is a path switch executed at the network side.

At 408, under Alternative 2, there is an anchoring or remapping of MCG DRBs vis the SN and a new measurement report (MR) from the UE.

It is noted that, as the SCG communication link is already active, the UE can send the RRC-Reconfiguration-complete indication after applying the fallback configuration without RACH access. Even though the new configuration involves a security key change, in some implementations the new configuration is handled by an inclusion of additional bits or information about the key to be used when sending the RRC-Reconfiguration-complete via a signal radio bearer (SRB).

It is noted that the Alternative 1 proposes to introduce handover to SN as a fallback configuration (i.e., reconfiguration from DC to SC). In this case the UE quickly applies the preconfigured CFC quickly without RACH access for minimum interruption. It is also noted that the Alternative 2 proposes the MCG bearer anchoring as a conditional reconfiguration for M-RLF condition to minimize the interruption and at the same time to enable the pending CHO execution to continue. If the bearer anchoring is applied without any lower layer configuration changes, the UE can continue to evaluate and apply CHO configuration. If the UE has critical data to be sent (in the MCG bearers), the fallback configuration will allow a faster resumption compared to Rel-16 based MCG-Failure-recovery.

Figure 5:
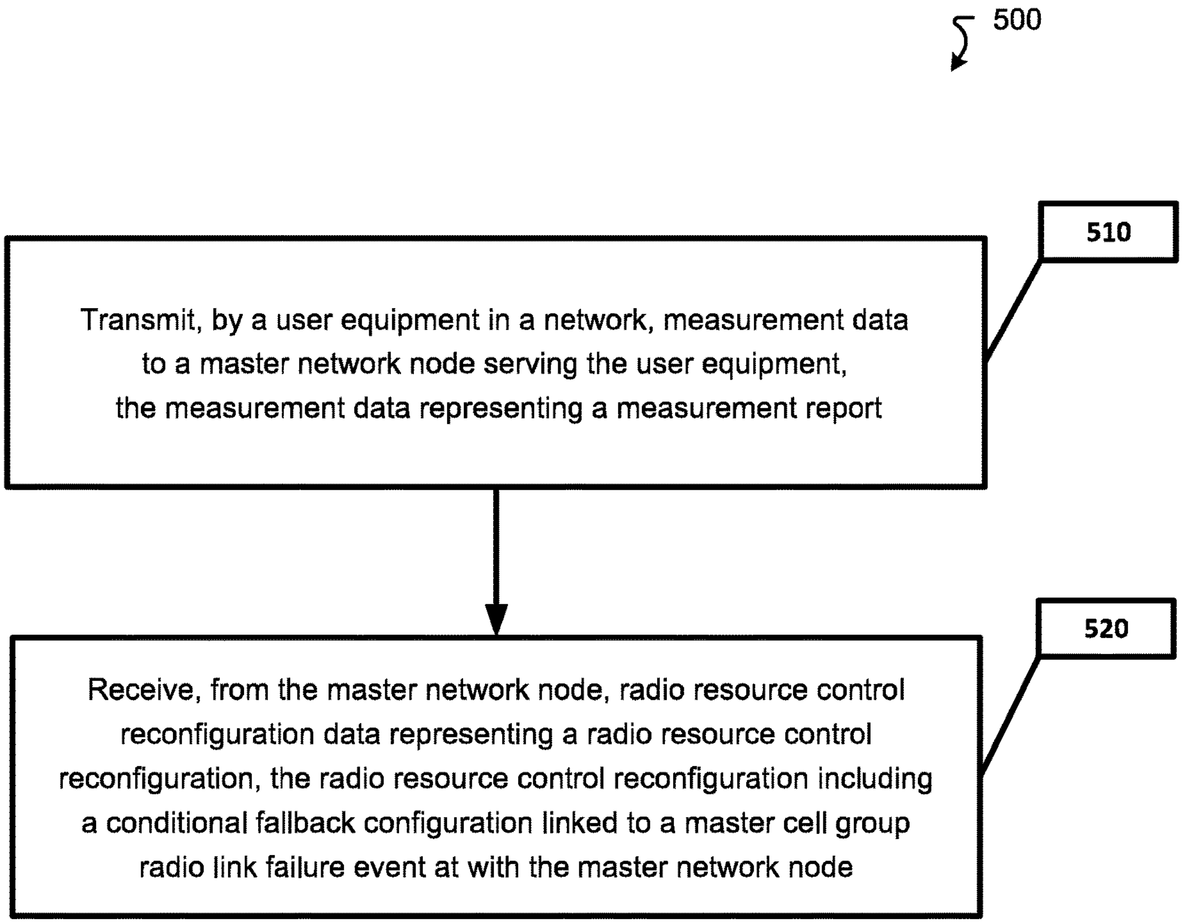
FIG. 5 is a flow chart illustrating a procedure of generating a conditional fallback configuration (CFC) for a master cell group radio link failure (MCG-RLF) according to an example implementation.

Example 1-1: FIG. 5 is a flow chart illustrating an example method 500 of performing random access in an antenna-distributed network. Operation 510 includes transmitting, by a user equipment in a network, measurement data to a master network node serving the user equipment, the measurement data representing a measurement report. Operation 520 includes receiving, from the master network node, radio resource control reconfiguration data representing a radio resource control reconfiguration, the radio resource control reconfiguration including a conditional fallback configuration linked to a master cell group radio link failure event with the master network node.

Example 1-2: According to an example implementation of Example 1-1, wherein the radio resource control reconfiguration data includes conditional handover configuration data representing instructions for a conditional handover.

Example 1-3: According to an example implementation of Examples 1-1 or 1-2, further comprising detecting a master cell group radio link failure at the master network node; and in response to the detecting, applying the conditional fallback configuration.

Example 1-4: According to an example implementation of Example 1-3, further comprising, prior to applying the conditional fallback configuration, performing a measurement criteria verification operation on conditional fallback configuration measurements.

Example 1-5: According to an example implementation of Examples 1-3 or 1-4, further comprising, prior to applying the conditional fallback configuration, stopping evaluation of pending conditional handover configurations.

Example 1-6: According to an example implementation of any of Examples 1-1 to 1-5, wherein the conditional fallback configuration includes instructions for performing a handover from the master network node to a secondary network node serving the user equipment.

Example 1-7: According to an example implementation of Example 1-6, wherein the instructions include a reconfiguration of a current primary-secondary cell associated with the secondary network node as a primary cell associated with the master network node.

Example 1-8: According to an example implementation of any of Examples 1-1 to 1-7, wherein the conditional fallback configuration includes reference signal received power measurement check performed on a secondary cell group associated with a secondary network node serving the user equipment.

Example 1-9: According to an example implementation of any of Examples 1-1 to 1-8, wherein a dedicated scheduling request resource is configured to enable faster switching to the conditional fallback configuration via a secondary cell group associated with a secondary network node serving the user equipment.

Example 1-10: According to an example implementation of any of Examples 1-1 to 1-9, wherein the conditional fallback configuration includes instructions to anchor radio bearers of a master cell group as radio bearers of a secondary cell group, the master cell group being associated with the master network node, the secondary cell group associated with a secondary network node serving the user equipment.

Example 1-11: According to an example implementation of Example 1-10, wherein the instructions to anchor include instructions to route master radio bearer data representing the radio bearers of the master cell group via the secondary network node.

Example 1-12: According to an example implementation of Example 1-11, wherein the conditional fallback configuration further includes a condition reconfiguration for initiating a remapping of the radio bearers of the master cell group to the secondary cell group.

Example 1-13: According to an example implementation of Example 1-12, wherein the remapping of the radio bearers of the master cell group to the secondary cell group includes a remapping of the radio bearers of the secondary cell group to the radio bearers of the master cell group through the master network node once access to a primary cell is successful.

Example 1-14: According to an example implementation of any of Examples 1-1 to 1-13, wherein the conditional fallback configuration includes a required condition for fallback configuration, and wherein, in response to the required condition for fallback configuration being met, a Timing Advance timer is running at a secondary cell group associated with a secondary network node.

Example 1-15: According to an example implementation of Example 1-14, further comprising, in response to the Timing Advance timer running at the secondary cell group when the required condition for fallback configuration is met, transmitting a scheduling request using a dedicated scheduling request resource which is mapped to the conditional fallback configuration.

Example 1-16: According to an example implementation of Example 1-15, further comprising, in response to the scheduling request, receiving an uplink grant, the uplink grant indicating that the scheduling request is for transmission of a handover complete indication for fallback configuration.

Example 1-17: An apparatus comprising means for performing a method of any of Examples 1-1 to 1-16.

Example 1-18: A computer program product including a non-transitory computer-readable storage medium and storing executable code that, when executed by at least one data processing apparatus, is configured to cause the at least one data processing apparatus to perform a method of any of Examples 1-1 to 1-16.

Figure 6:
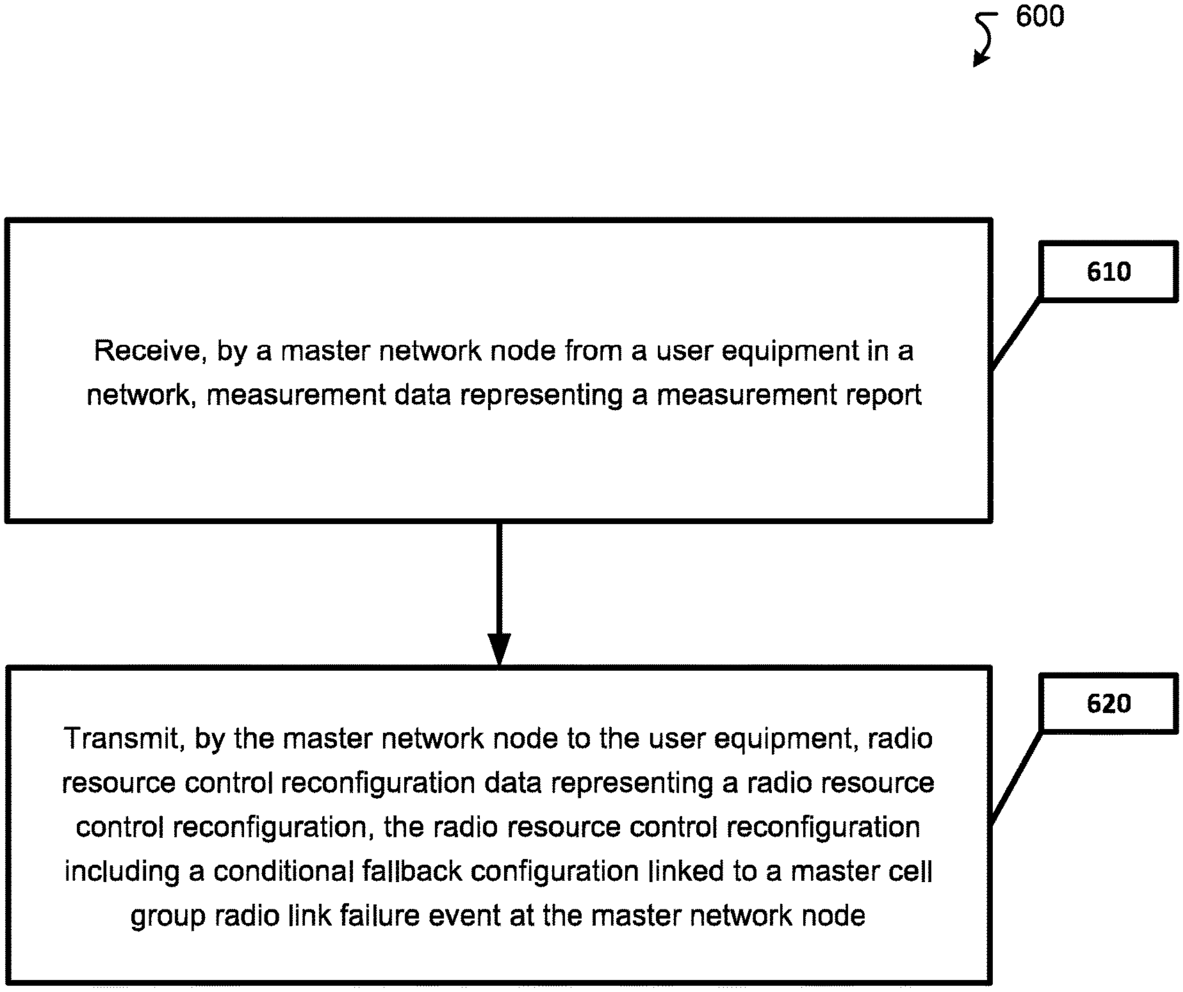
FIG. 6 is a flow chart illustrating a procedure of generating a conditional fallback configuration (CFC) for a master cell group radio link failure (MCG-RLF) according to an example implementation.

Example 2-1: FIG. 6 is a flow chart illustrating a process 600 of performing random access in an antenna-distributed network. Operation 610 includes receiving, by a master network node from a user equipment in a network, measurement data representing a measurement report. Operation 620 includes transmitting, by the master network node to the user equipment, radio resource control reconfiguration data representing a radio resource control reconfiguration, the radio resource control reconfiguration including a conditional fallback configuration linked to a master cell group radio link failure event at the master network node.

Example 2-2: According to an example implementation of Example 2-1, further comprising generating the conditional fallback configuration with a current secondary network node serving the user equipment for a handover between the master network node and the secondary network node Example 2-3: According to an example implementation of Examples 2-1 or 2-2, wherein the radio resource control reconfiguration data further includes a conditional handover configuration for target cells.

Example 2-4: According to an example implementation of any of Examples 2-1 to 2-3, wherein the conditional fallback configuration is mapped to a master cell group radio link failure event and is based on whether a target master cell group reference signal received power is greater than a threshold.

Example 2-5: An apparatus comprising means for performing a method of any of Examples 2-1 to 2-4.

Example 2-6: A computer program product including a non-transitory computer-readable storage medium and storing executable code that, when executed by at least one data processing apparatus, is configured to cause the at least one data processing apparatus to perform a method of any of Examples 2-1 to 2-4.

Figure 7:
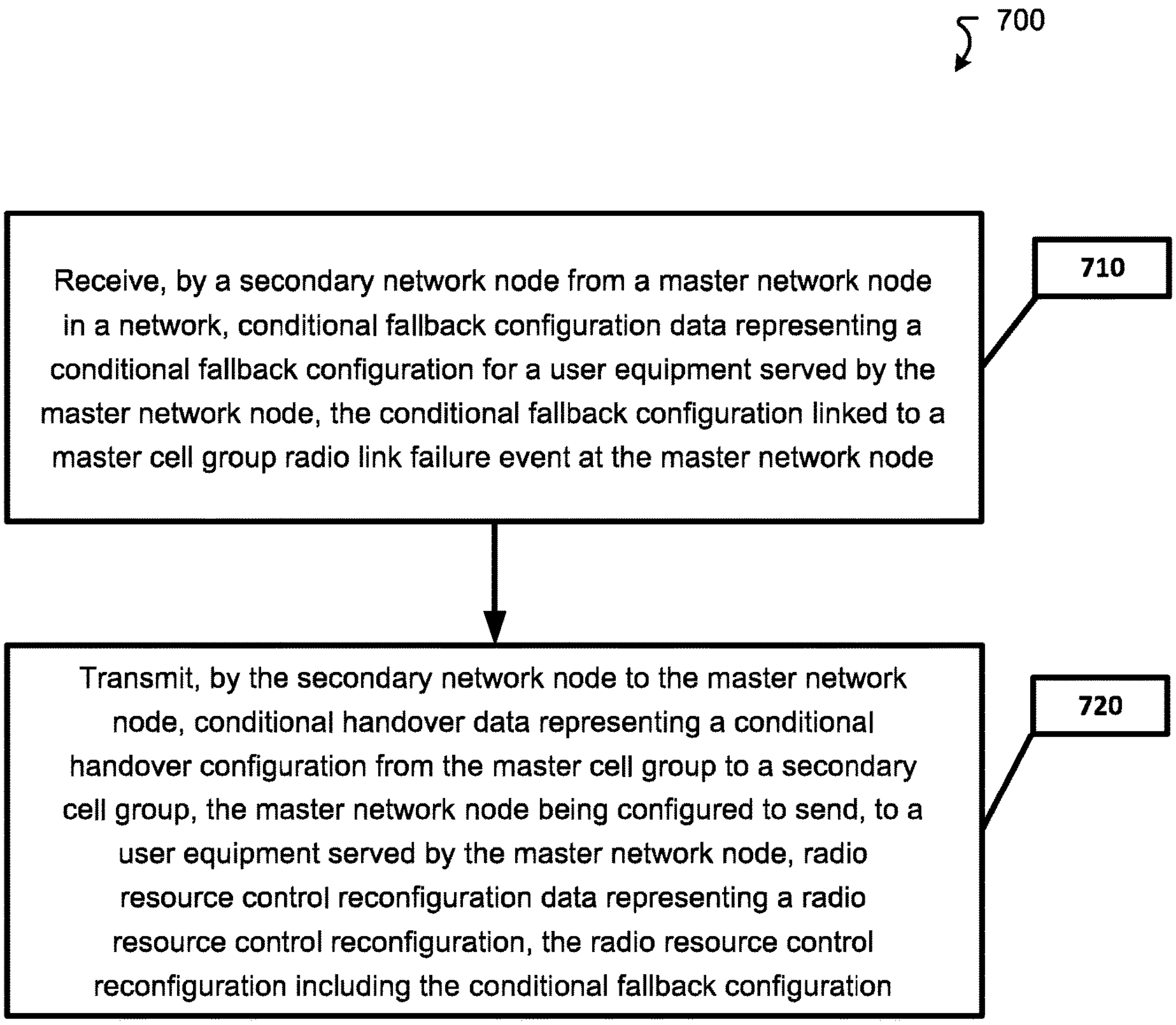
FIG. 7 is a flow chart illustrating a procedure of generating a conditional fallback configuration (CFC) for a master cell group radio link failure (MCG-RLF) according to an example implementation.

Example 3-1: FIG. 7 is a flow chart illustrating a process 700 of performing random access in an antenna-distributed network. Operation 710 includes receiving, by a secondary network node from a master network node in a network, conditional fallback configuration data representing a conditional fallback configuration for a user equipment served by the master network node, the conditional fallback configuration linked to a master cell group radio link failure event at the master network node. Operation 720 includes transmitting, by the secondary network node to the master network node, conditional handover data representing a conditional handover configuration from the master cell group to a secondary cell group, the master network node being configured to send, to a user equipment served by the master network node, radio resource control reconfiguration data representing a radio resource control reconfiguration, the radio resource control reconfiguration including the conditional fallback configuration.

Example 3-2: According to an example implementation of Example 3-1, further comprising, upon a detection of a radio link failure, receive master cell group bearer data routed from the master network node until a new primary cell is determined; and after the new primary cell is determined, re-route secondary cell group data radio bearers to the master network node.

Example 3-3: According to an example implementation of Examples 3-1 or 3-2, further comprising, during a time at which a condition for the conditional fallback configuration is met, run a Timing Advance timer; and during the time, receive, from the user equipment, a scheduling request, the scheduling request using a dedicated scheduling request resource which is mapped to the conditional fallback configuration.

Example 3-4: According to an example implementation of Example 3-3, further comprising, in response to the scheduling request, transmitting, to the user equipment, an uplink grant, the uplink grant indicating that the scheduling request is for transmission of a handover complete indication for the conditional fallback configuration.

Example 3-5: An apparatus comprising means for performing a method of Examples 3-1 to 3-4.

Example 3-6: A computer program product including a non-transitory computer-readable storage medium and storing executable code that, when executed by at least one data processing apparatus, is configured to cause the at least one data processing apparatus to perform a method of Examples 3-1 to 3-4.

List of example abbreviations:

| | |
|---|---|
| AP | Access Point |
| BWP | Bandwidth Part |
| C-RNTI | Cell RNTI |
| CSI | Channel state information |
| CSI-RS | CSI reference signal |
| D-MIMO | Distributed MIMO |
| DL | Downlink |
| DM-RS | Demodulation reference signal |
| gNB | 5G Base Station |
| MIMO | Multi-Input Multi-Output |
| NR | New Radio (5G) |
| PL | Path Loss |
| PRACH | Physical RACH |
| PDSCH | Physical downlink shared channel |
| PUSCH | Physical uplink shared channel |
| RACH | Random Access Channel |
| RAR | RACH Response |
| RNTI | Radio Network Temporary Identifier |
| RS | Reference Signal |
| RSRP | Reference Signal Received Power |
| Rx | Receive |
| Rx-Tx | Receive-Transmit |
| SFN | Single Frequency Network |
| SSB | Synchronization Signal Block |
| TRP | Transmission/Reception Point |
| Tx | Transmit |
| UE | User Equipment |
| UL | Uplink |

Figure 8:
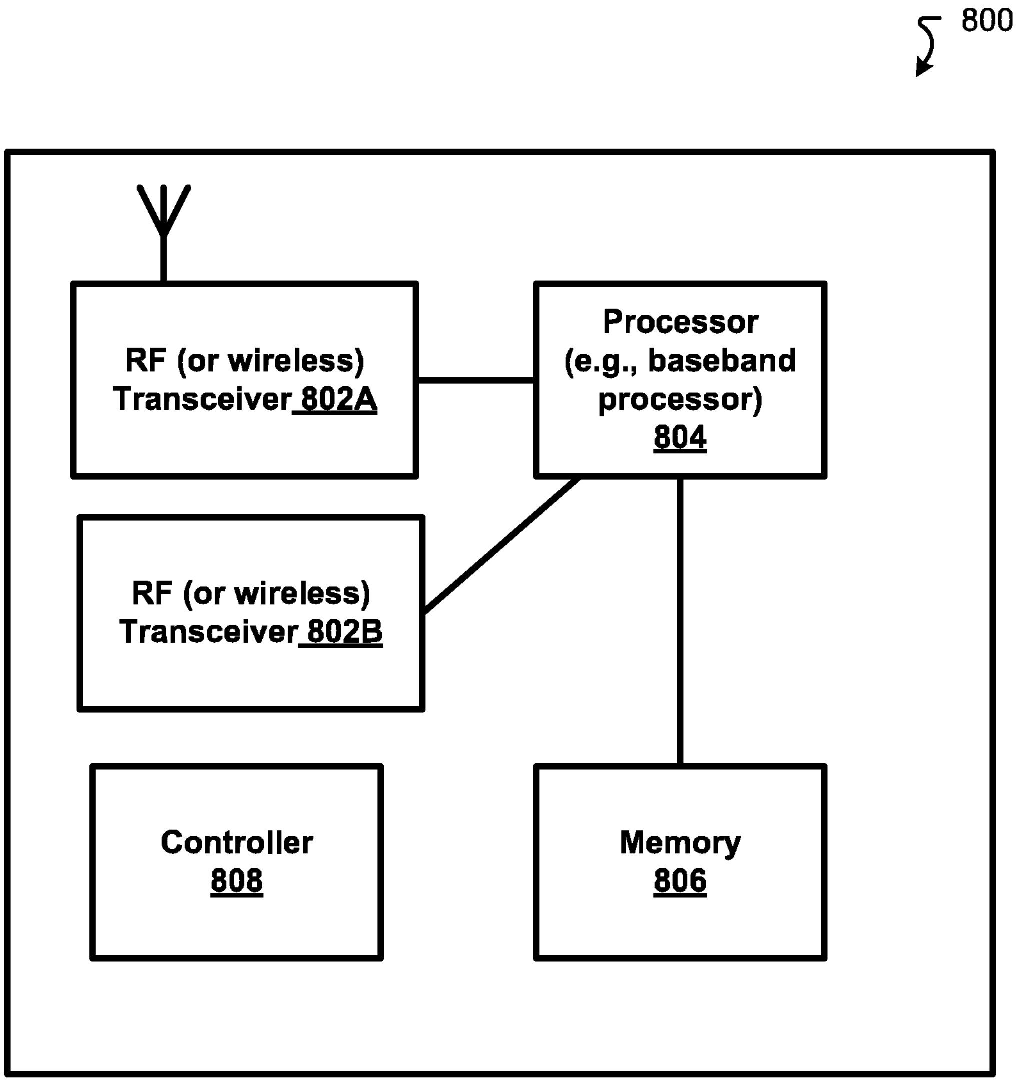
FIG. 8 is a block diagram of a node or wireless station (e.g., base station/access point, relay node, or mobile station/user device) according to an example implementation.

FIG. 8 is a block diagram of a wireless station (e.g., AP, BS, e/gNB, NB-IoT UE, UE or user device) 800 according to an example implementation. The wireless station 800 may include, for example, one or multiple RF (radio frequency) or wireless transceivers 802A, 802B, where each wireless transceiver includes a transmitter to transmit signals (or data) and a receiver to receive signals (or data). The wireless station also includes a processor or control unit/entity (controller) 804 to execute instructions or software and control transmission and receptions of signals, and a memory 806 to store data and/or instructions.

Processor 804 may also make decisions or determinations, generate slots, subframes, packets or messages for transmission, decode received slots, subframes, packets or messages for further processing, and other tasks or functions described herein. Processor 804, which may be a baseband processor, for example, may generate messages, packets, frames or other signals for transmission via wireless transceiver 802 (802A or 802B). Processor 804 may control transmission of signals or messages over a wireless network, and may control the reception of signals or messages, etc., via a wireless network (e.g., after being down-converted by wireless transceiver 802, for example). Processor 804 may be programmable and capable of executing software or other instructions stored in memory or on other computer media to perform the various tasks and functions described above, such as one or more of the tasks or methods described above. Processor 804 may be (or may include), for example, hardware, programmable logic, a programmable processor that executes software or firmware, and/or any combination of these. Using other terminology, processor 804 and transceiver 802 together may be considered as a wireless transmitter/receiver system, for example.

In addition, referring to FIG. 8, a controller (or processor) 808 may execute software and instructions, and may provide overall control for the station 800, and may provide control for other systems not shown in FIG. 8 such as controlling input/output devices (e.g., display, keypad), and/or may execute software for one or more applications that may be provided on wireless station 800, such as, for example, an email program, audio/video applications, a word processor, a Voice over IP application, or other application or software.

In addition, a storage medium may be provided that includes stored instructions, which when executed by a controller or processor may result in the processor 804, or other controller or processor, performing one or more of the functions or tasks described above.

According to another example implementation, RF or wireless transceiver(s) 802A/802B may receive signals or data and/or transmit or send signals or data. Processor 804 (and possibly transceivers 802A/802B) may control the RF or wireless transceiver 802A or 802B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G uses multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IoT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. An apparatus, comprising:

at least one processor; and at least one memory including computer program code;

the at least one memory and the computer program code configured to cause the apparatus at least to:

transmit, by a user equipment in a network, measurement data to a master network node serving the user equipment, the measurement data representing a measurement report;

receive, from the master network node, radio resource control reconfiguration data representing a radio resource control reconfiguration, the radio resource control reconfiguration including a conditional fallback configuration linked to a master cell group radio link failure event at the master network node, wherein the conditional fallback configuration includes a required condition for fallback configuration;

based on the required condition for the conditional fallback configuration being met, run a Timing Advance (TA) timer at a secondary cell group associated with a secondary network node; and based on the TA timer running at the secondary cell group when the required condition for the conditional fallback configuration is met, transmit a scheduling request using a dedicated scheduling request resource mapped to the conditional fallback configuration.

2. The apparatus as in claim 1, wherein the radio resource control reconfiguration data further includes conditional handover configuration data representing instructions for a conditional handover.

3. The apparatus as in claim 1, wherein the at least one memory and the computer program code are further configured to cause the apparatus at least to:

detect a master cell group radio link failure at the master network node; and in response to the detecting, apply the conditional fallback configuration.

4. The apparatus as in claim 3, wherein the at least one memory and the computer program code are further configured to cause the apparatus at least to:

prior to applying the conditional fallback configuration, perform a measurement criteria verification operation on measurements associated with the conditional fallback configuration.

5. The apparatus as in claim 3, wherein the at least one memory and the computer program code are further configured to cause the apparatus at least to:

prior to applying the conditional fallback configuration, stop evaluation of pending conditional handover configurations.

6. The apparatus as in claim 1, wherein the conditional fallback configuration includes instructions for performing a handover from the master network node to the secondary network node serving the user equipment.

7. The apparatus as in claim 6, wherein the instructions include a reconfiguration of a current primary-secondary cell associated with the secondary network node as a primary cell associated with the master network node.

8. The apparatus as in claim 1, wherein the conditional fallback configuration includes a reference signal received power measurement check performed on a secondary cell group associated with a secondary network node serving the user equipment.

9. The apparatus as in claim 1, wherein the conditional fallback configuration includes instructions to anchor radio bearers of a master cell group as radio bearers of a secondary cell group, the master cell group being associated with the master network node, the secondary cell group associated with a secondary network node serving the user equipment.

10. The apparatus as in claim 9, wherein the instructions to anchor include instructions to route master data radio bearer representing the radio bearers of the master cell group via the secondary network node.

11. The apparatus as in claim 10, wherein the conditional fallback configuration further includes a conditional reconfiguration for initiating a remapping of the radio bearers of the master cell group to the secondary cell group.

12. The apparatus as in claim 11, wherein the remapping of the radio bearers of the master cell group to the secondary cell group includes a remapping of the radio bearers of the secondary cell group to the radio bearers of the master cell group through the master network node once access to a primary cell is successful.

13. The apparatus as in claim 1, wherein the at least one memory and the computer program code are further configured to cause the apparatus at least to:

in response to the scheduling request, receive an uplink grant, the uplink grant indicating that the scheduling request is for transmission of a handover complete indication for fallback configuration.

14. A method, comprising:

transmitting, by a user equipment in a network, measurement data to a master network node serving the user equipment, the measurement data representing a measurement report;

receiving, from the master network node, radio resource control reconfiguration data representing a radio resource control reconfiguration, the radio resource control reconfiguration including a conditional fallback configuration linked to a master cell group radio link failure event at the master network node, wherein the conditional fallback configuration includes a required condition for fallback configuration;

based on the required condition for the conditional fallback configuration being met, a Timing Advance (TA) timer is running at a secondary cell group associated with a secondary network node; and based on the TA timer running at the secondary cell group when the required condition for the conditional fallback configuration is met, transmit a scheduling request using a dedicated scheduling request resource mapped to the conditional fallback configuration.

* * * * *